US012359790B1

(12) United States Patent
Li et al.

(10) Patent No.: US 12,359,790 B1
(45) Date of Patent: Jul. 15, 2025

(54) FLOATING PROJECTION DECORATIVE LAMP

(71) Applicant: SICHUAN COOTWAY TECHNOLOGY CO., LTD., Sichuan (CN)

(72) Inventors: Daiquan Li, Sichuan (CN); Chunhai Zhao, Sichuan (CN)

(73) Assignee: SICHUAN COOTWAY TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 18/947,243

(22) Filed: Nov. 14, 2024

(30) Foreign Application Priority Data

Nov. 8, 2024 (CN) ......................... 202422730542.6

(51) Int. Cl.

| | |
|---|---|
| ***F21V 3/02*** | (2006.01) |
| ***F21S 9/03*** | (2006.01) |
| ***F21V 3/10*** | (2018.01) |
| ***F21V 11/16*** | (2006.01) |
| ***F21V 15/01*** | (2006.01) |
| ***F21V 23/04*** | (2006.01) |

(52) U.S. Cl.
CPC .............. *F21V 3/026* (2013.01); *F21S 9/037* (2013.01); *F21V 3/10* (2018.02); *F21V 11/16* (2013.01); *F21V 15/01* (2013.01); *F21V 23/0464* (2013.01)

(58) Field of Classification Search
CPC . F21V 3/026; F21V 3/10; F21V 11/16; F21V 15/01; F21V 23/0464; F21S 9/037
USPC ..................................................... 362/311.13
See application file for complete search history.

(56) References Cited

U.S. PATENT DOCUMENTS

| | | | | |
|---|---|---|---|---|
| 7,413,319 | B2 * | 8/2008 | Longoria ................ | G09F 13/24 362/267 |
| 9,433,199 | B2 * | 9/2016 | Reed ...................... | A01K 93/00 |
| 10,539,305 | B2 * | 1/2020 | Fuller .................... | H05B 47/19 |
| 2013/0187569 | A1 * | 7/2013 | Chin-Huan ............. | F21V 3/026 315/307 |
| 2016/0341380 | A1 * | 11/2016 | Stork ...................... | F21V 3/026 |
| 2021/0262638 | A1 * | 8/2021 | Zhao ......................... | F21V 9/00 |
| 2023/0059497 | A1 * | 2/2023 | Salzinger ............. | H05B 47/105 |
| 2024/0426459 | A1 * | 12/2024 | Chen ..................... | F21V 23/008 |

* cited by examiner

*Primary Examiner* — Laura K Tso

(57) ABSTRACT

A floating projection decorative lamp includes an outer casing and a light emitting module arranged in the outer casing. The outer casing includes a main body part and a mapping part connected to a bottom of the main body part. The mapping part is provided with a transmissive pattern, the light-emitting module is configured to emit light towards the transmissive pattern, so that the light passing through the transmissive pattern forms a projection pattern corresponding to the transmissive pattern.

18 Claims, 14 Drawing Sheets

FLOATING PROJECTION DECORATIVE LAMP

CROSS-REFERENCE TO RELATED APPLICATIONS

The present invention claims priority of Chinese patent application CN2024227305426, filed on Nov. 8, 2024, which is incorporated herein by reference in its entireties.

TECHNICAL FIELD

The present invention relates to the technical field of lamps, in particular to a floating projection decorative lamp.

BACKGROUND

In recent years, floating decorative lamps, as a special category of decorative lamps, have gradually emerged in the market and been favored by consumers. These lamps mainly utilize the principle of buoyancy to achieve floating on water. There are many kinds of floating decorative lamps on the market. However, the majority of the commercially available floating decorative lamps are characterized by high costs, large sizes, and high selling prices.

SUMMARY

The main purpose of the present invention is to provide a floating projection decorative lamp.

A floating projection decorative lamp includes an outer casing; and a light emitting module arranged in the outer casing, wherein the outer casing includes a main body part and a mapping part connected to a bottom of the main body part; the mapping part is provided with a transmissive pattern, the light-emitting module is configured to emit light towards the transmissive pattern, so that the light passing through the transmissive pattern forms a projection pattern corresponding to the transmissive pattern.

Further, the main body part encloses a first accommodating space, the mapping part is connected to the bottom of the main body part and encloses a second accommodating space together with the main body part, and the light emitting module is arranged in the second accommodating space.

Further, the main body part is made of a flexible inflatable material, the first accommodating space is configured for filling with air, the mapping part is made of the same material as the main body part, and a volume of the second accommodating space is smaller than a volume of the first accommodating space.

Further, the light-emitting module includes a housing and a first light source arranged in the housing, a light-passing opening is arranged on one side of the housing facing the transmissive pattern, and the first light source is arranged in the light-passing opening.

Further, the light emitting module further includes a circuit board and a battery arranged in the housing, the first light source is arranged on the circuit board, and the battery, the circuit board and the first light source are electrically connected in sequence.

Further, the light emitting module further includes a solar panel, the solar panel is arranged on an outside of the housing, the solar panel is positioned to face upward, and the solar panel is electrically connected to the circuit board.

Further, the light emitting module further includes a sensing device arranged on the circuit board, the housing is provided with a through hole, the through hole is arranged to face upward, and the sensing device corresponds to a position of the through hole.

Further, the light emitting module further includes a diffusing paper, and the diffusing paper is fitted over the through hole.

Further, the outer casing is made of a light-transmitting material.

Further, the mapping part includes a bottom housing, and the transmissive pattern is arranged on the bottom housing.

Further, the bottom housing is made of PVC.

Further, the transmissive pattern is printed by silk-screening on the bottom housing.

Further, a shape of the transmissive pattern can be any one or combination of an animal shape, a plant shape, a geometric shape and an irregular shape.

Further, the floating projection decorative lamp further includes a protective cover, the protective cover is arranged in the second accommodating space, and the protective cover is located above the transmissive pattern.

Further, the protective cover is made of a transparent material.

Further, the light emitting module further includes a light-gathering cover, the light-gathering cover is connected to the light-passing opening, and a plurality of transparent protrusions are arranged on an inner sidewall of the light-gathering cover.

Further, the light emitting module is detachably connected to the main body part.

Further, the light emitting module further includes a second light source, the second light source is electrically connected to the circuit board, and the second light source is arranged towards the main body part.

Further, a first light-transmitting cover is arranged on one sidewall of the housing towards the main body part, and a position of the first light-transmitting cover corresponds to the second light source; a second light-transmitting cover is arranged on one sidewall of the housing away from the main body part, and a position of the second light-transmitting cover corresponds to the first light source.

Further, the floating projection decorative lamp further includes an inflation port, and the inflation port is arranged on a sidewall of the main body part; the floating projection decorative lamp further includes a hanging head, and the hanging head is arranged at a top of the floating projection decorative lamp.

The present invention has the following beneficial effects. Compared with the prior art, the light-emitting module of the floating projection decorative lamp of the present invention has compact size and a simple light-emitting mode. Moreover, it is capable of projecting patterns and light spots in water. The present invention can be inflated and is made of light-transmitting materials. It is provided with a solar panel integrated inside, thus obviating the necessity of charging or battery replacement. Moreover, it is equipped with a sensing device that can control the illumination of the floating projection decorative lamp according to the changes in the brightness of the surrounding light. The floating projection decorative lamp provided by the present invention has a simple structure, low cost, and compact size. It can provide users with a better using experience.

BRIEF DESCRIPTION OF THE DRAWINGS

Implementations of the present invention will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present invention.

DETAILED DESCRIPTION OF THE EMBODIMENTS

Figure 1:
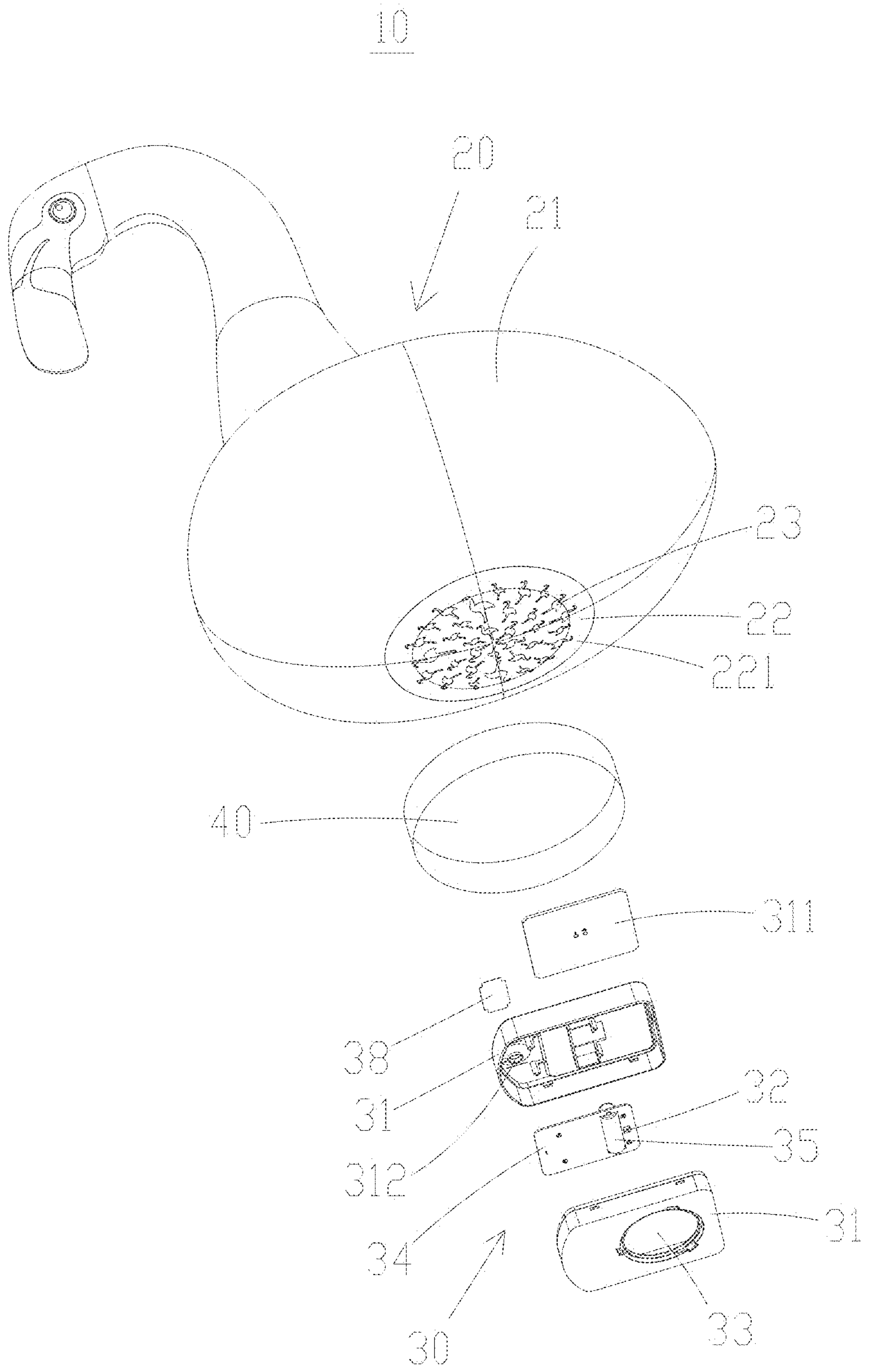
FIG. 1 is an exploded view schematic diagram of a floating projection decorative lamp according to a first embodiment of the present invention.
Figure 2:
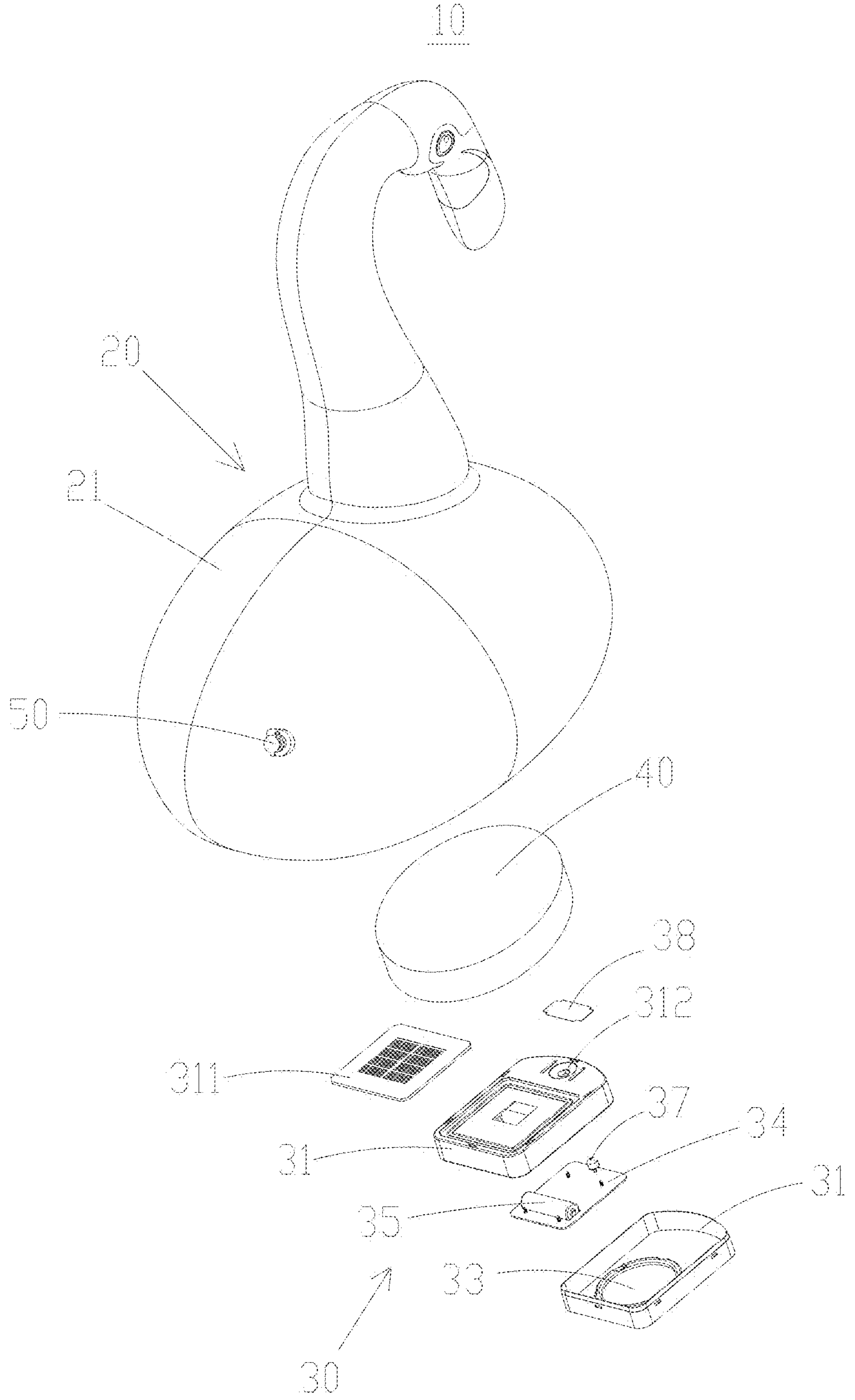
FIG. 2 is an exploded view schematic diagram of the floating projection decorative lamp of the first embodiment of the present invention from another view.
Figure 3:
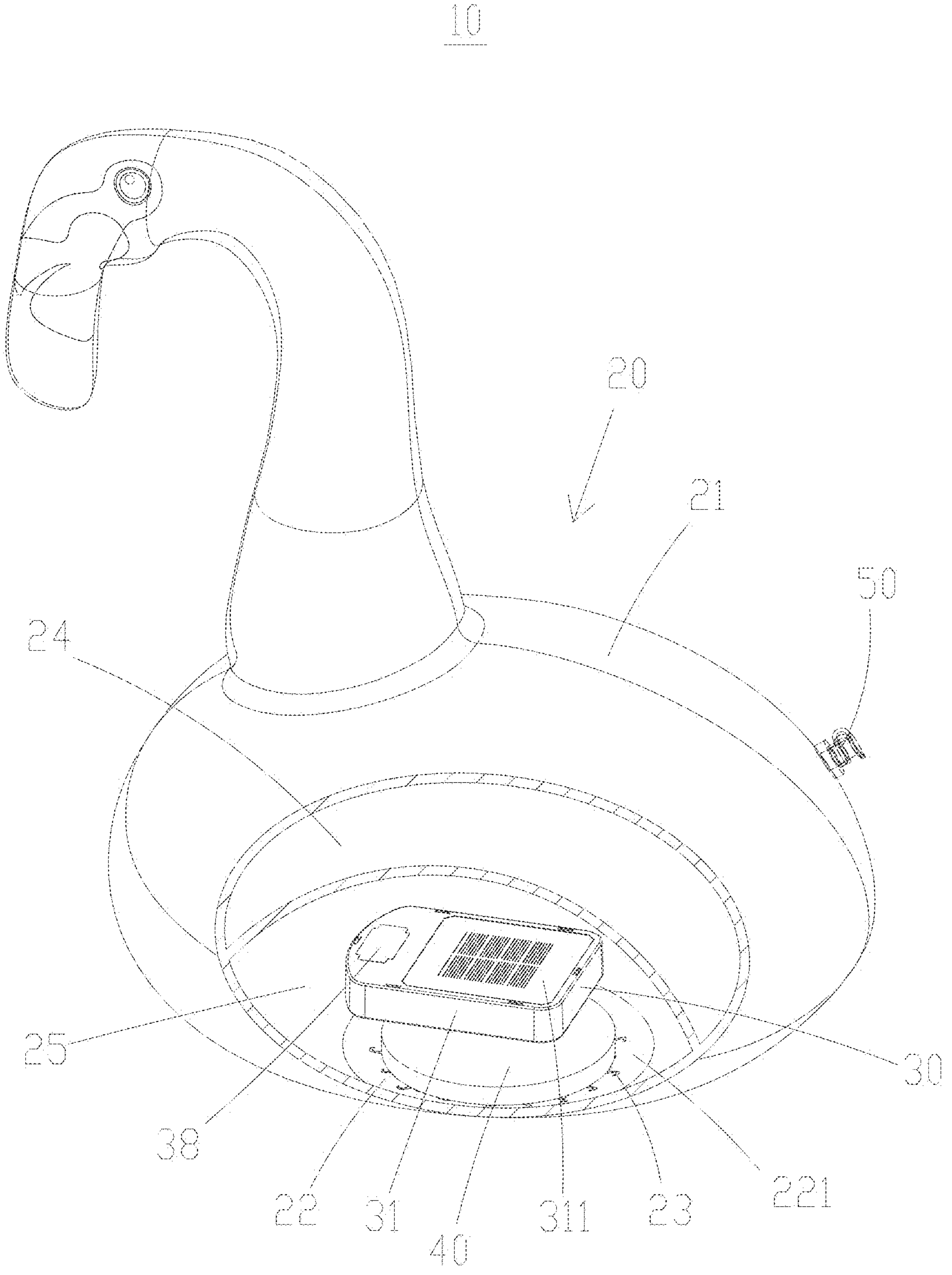
FIG. 3 is a cross-sectional view of the floating projection decorative lamp of the first embodiment of the present invention.
Figure 4:
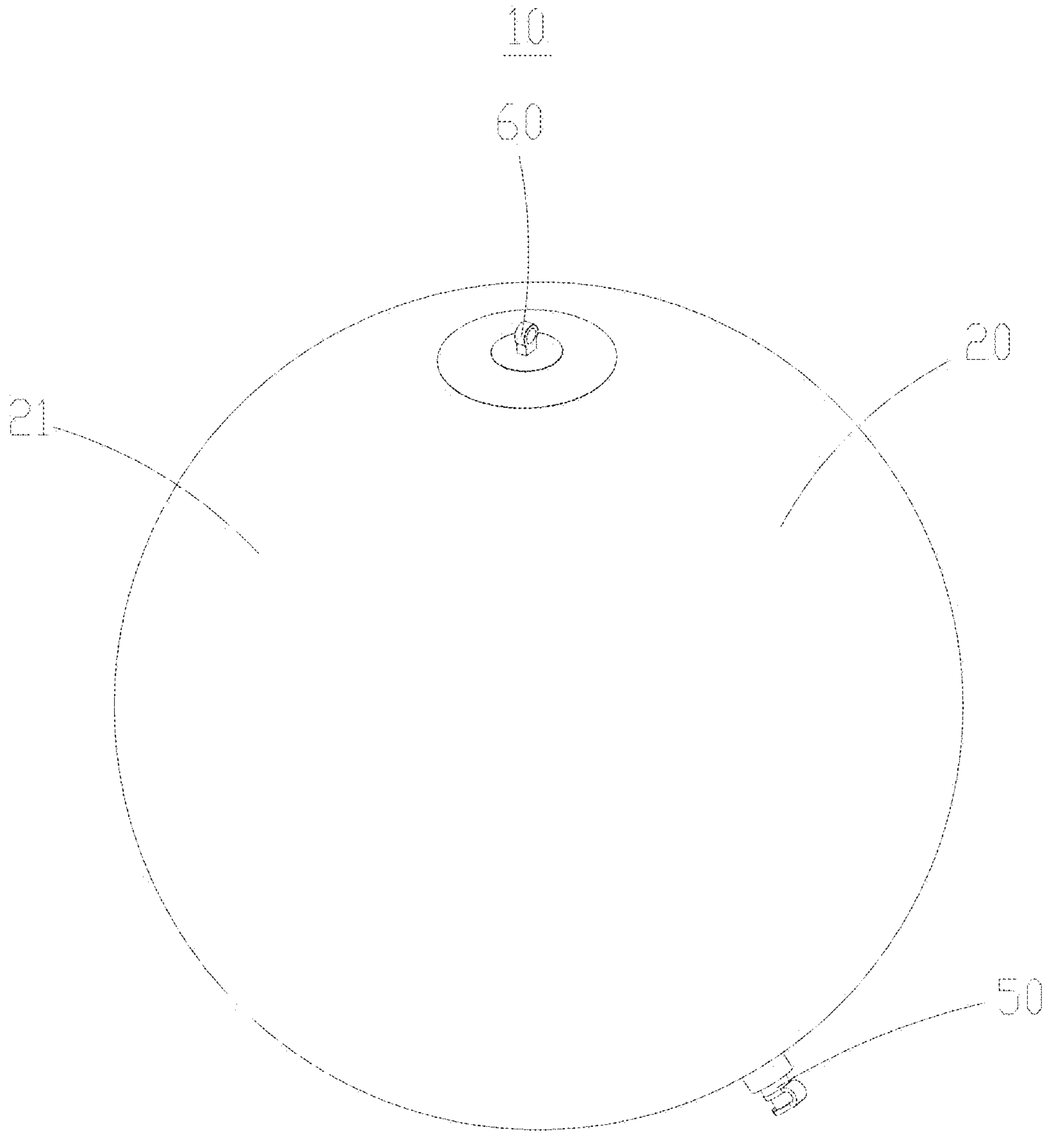
FIG. 4 is a schematic diagram of a floating projection decorative lamp of another embodiment of the present invention.
Figure 5:
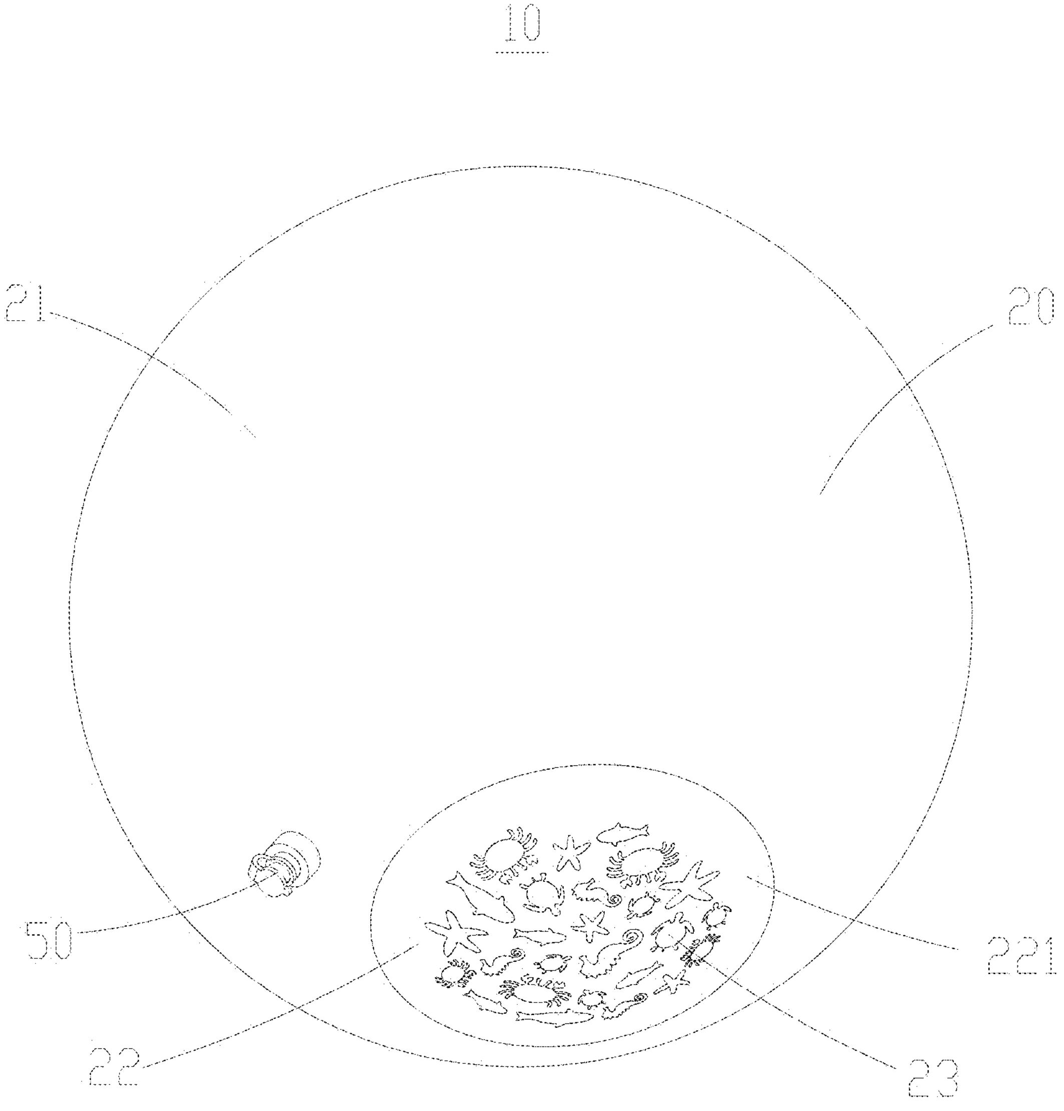
FIG. 5 is a schematic diagram of a floating projection decorative lamp of another embodiment of the present invention.
Figure 6:
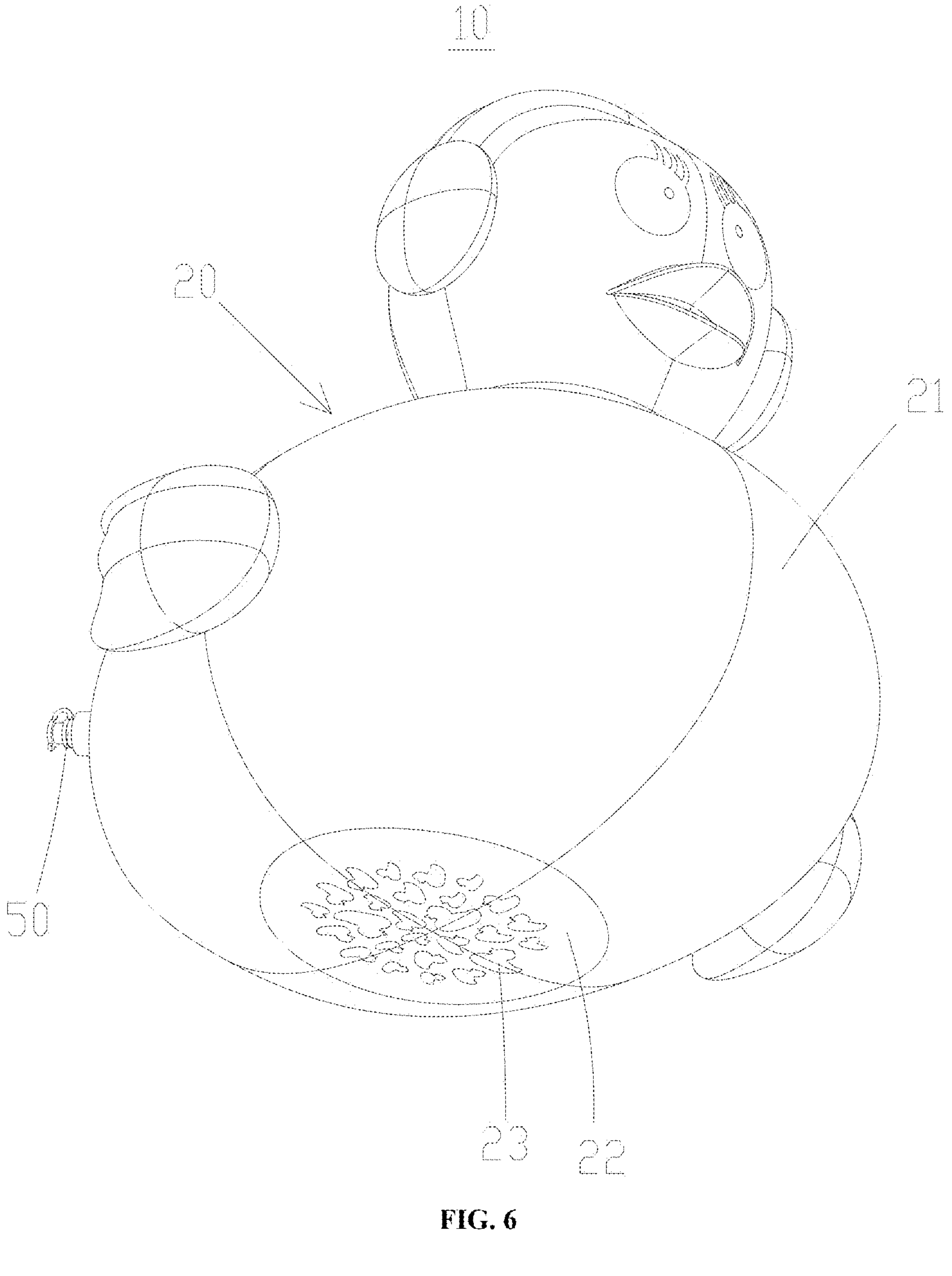
FIG. 6 is a schematic diagram of a floating projection decorative lamp of another embodiment of the present invention.
Figure 7:
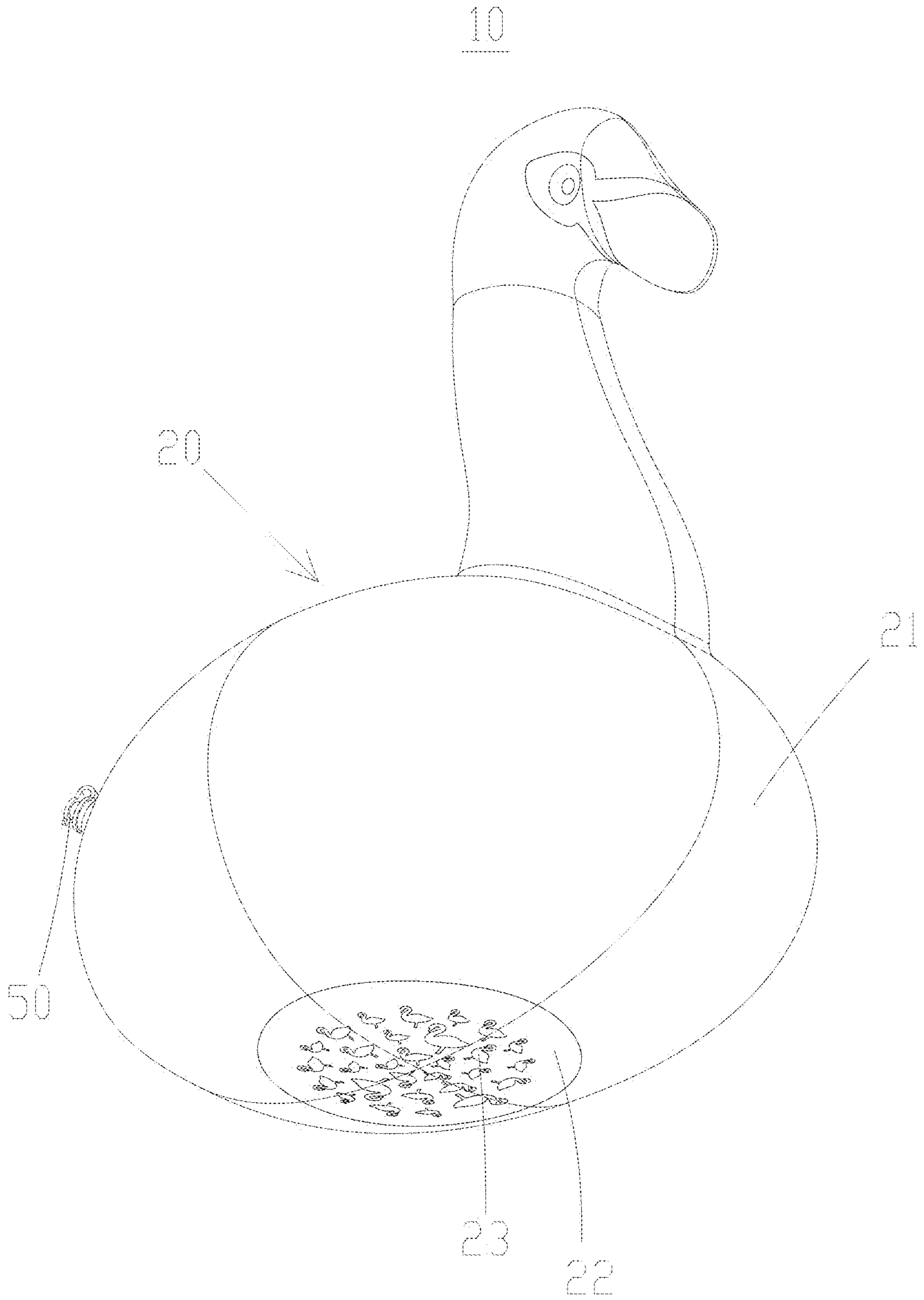
FIG. 7 is a schematic diagram of a floating projection decorative lamp of another embodiment of the present invention.
Figure 8:
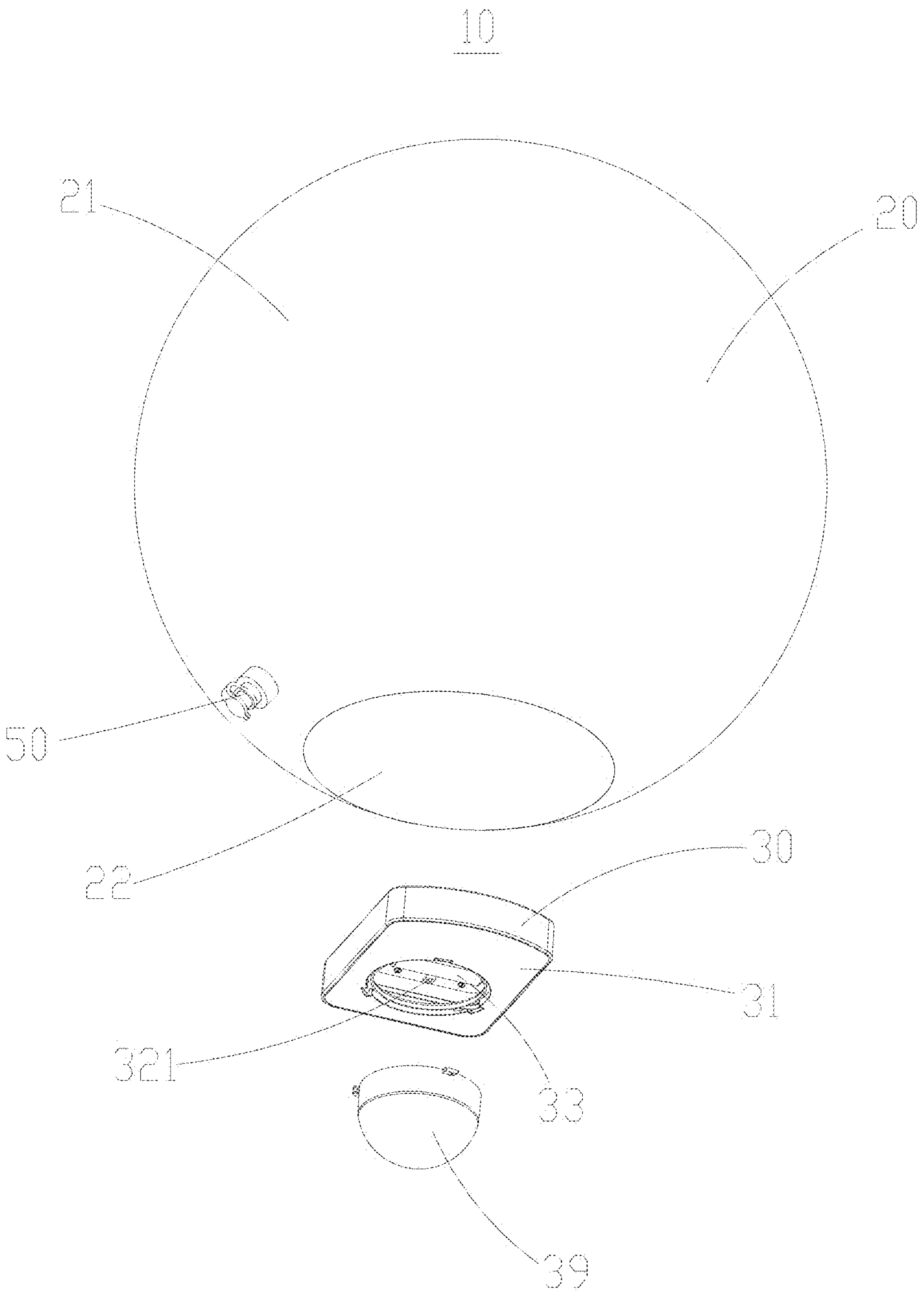
FIG. 8 is an exploded view of a floating projection decorative lamp of another embodiment of the present invention.
Figure 9:
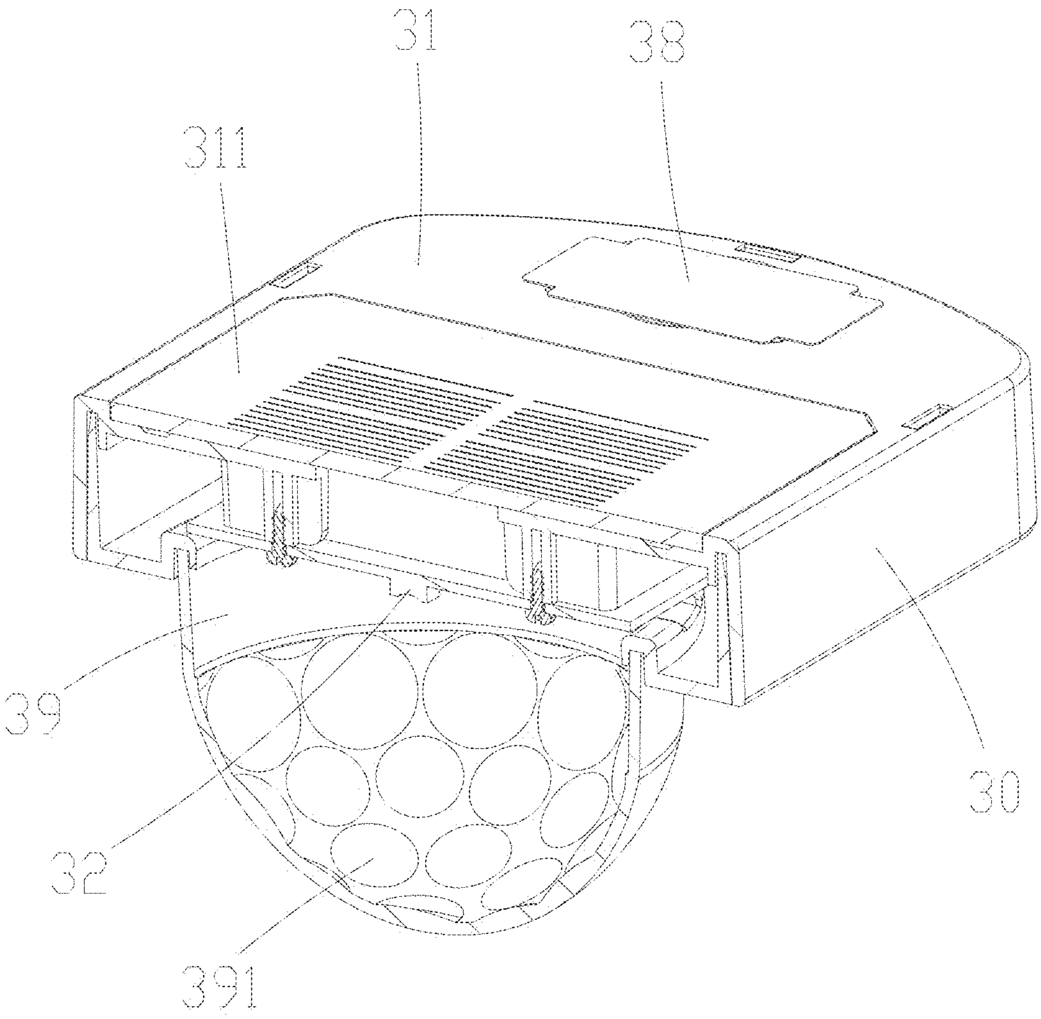
FIG. 9 is a cross-sectional view of a light emitting module of a floating projection decorative lamp of the present invention.
Figure 10:
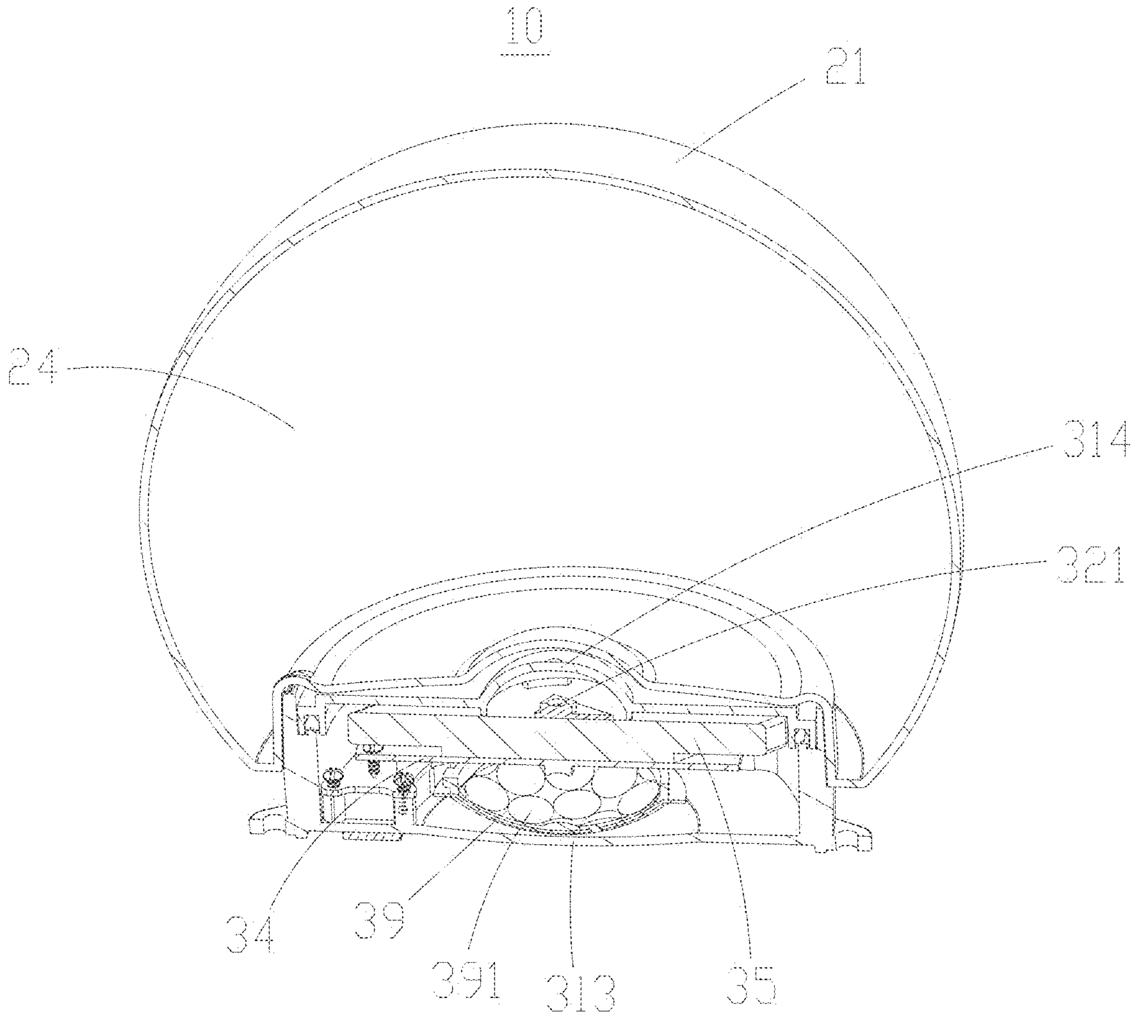
FIG. 10 is a schematic diagram of a floating projection decorative lamp of another embodiment of the present invention.
Figure 11:
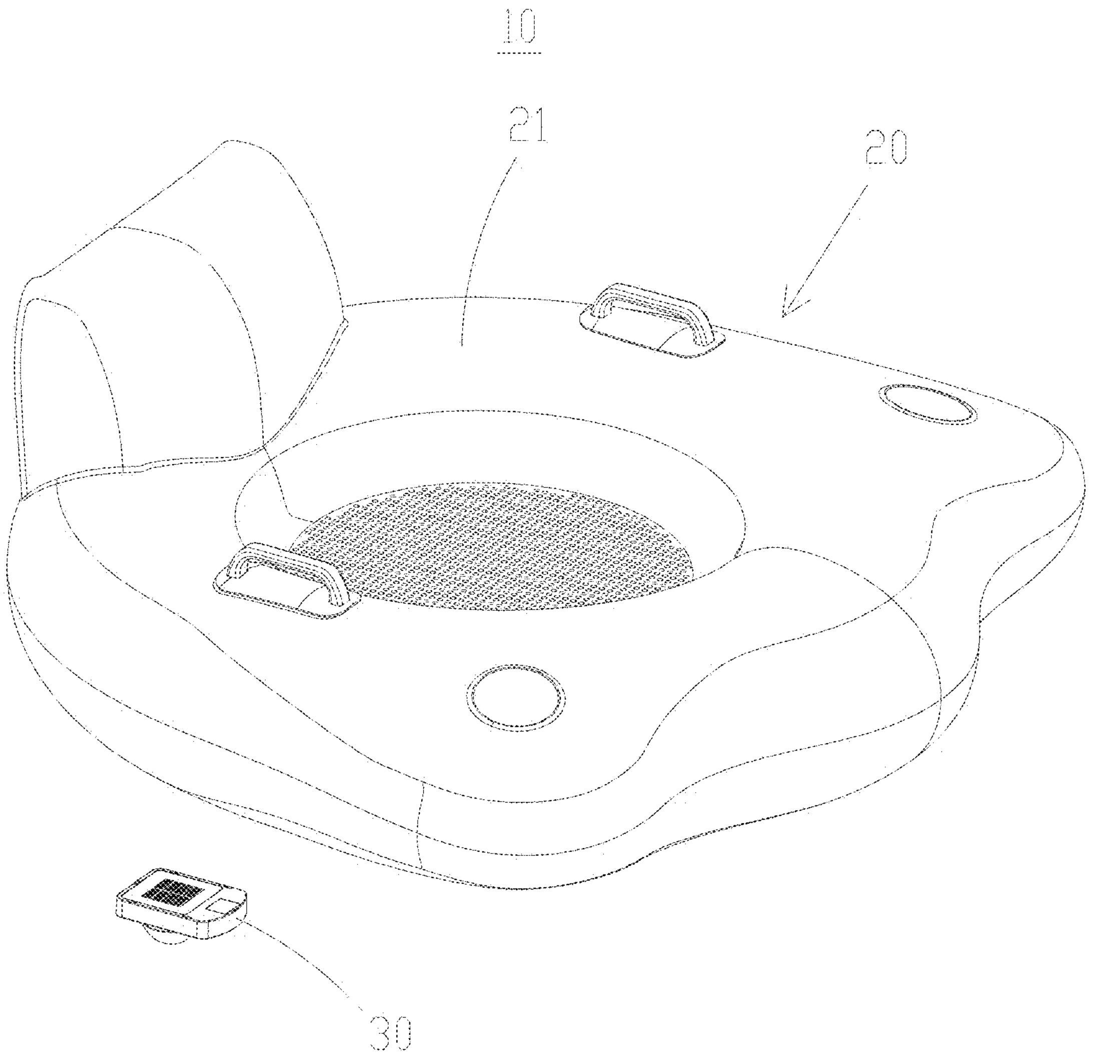
FIG. 11 is a schematic diagram of a floating projection decorative lamp of another embodiment of the present invention.
Figure 12:
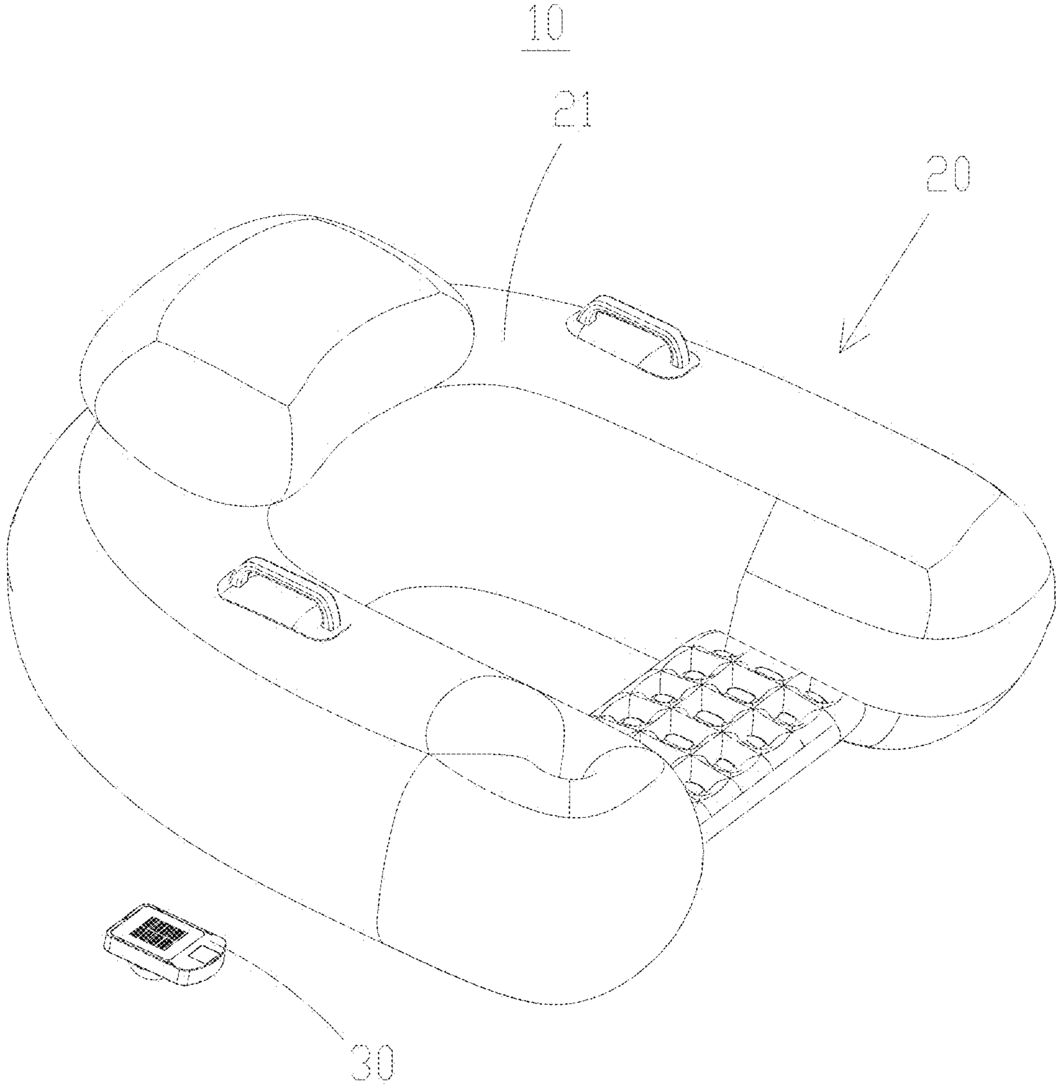
FIG. 12 is a schematic diagram of a floating projection decorative lamp of another embodiment of the present invention.
Figure 13:
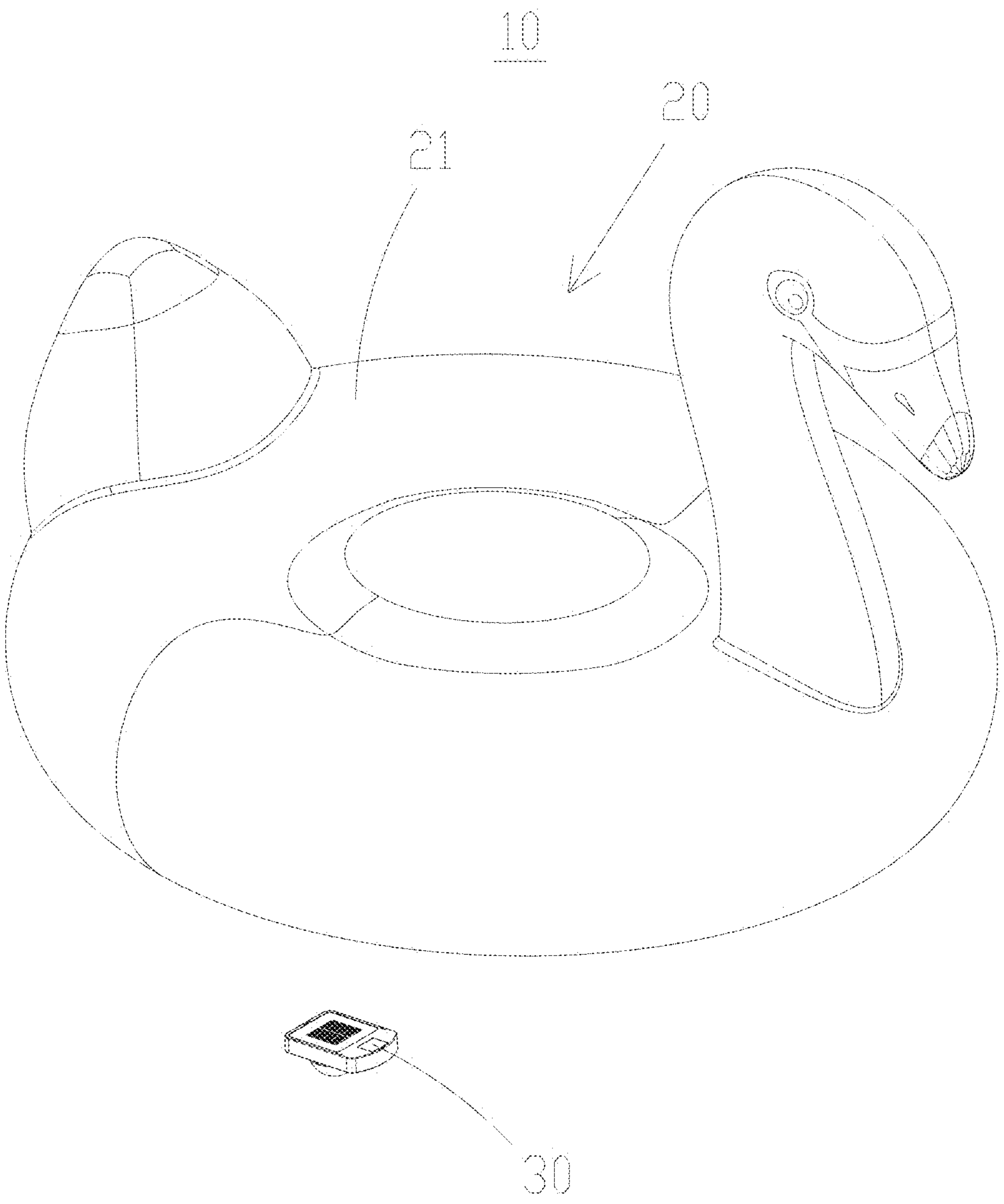
FIG. 13 is a schematic diagram of a floating projection decorative lamp of another embodiment of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present invention.

The term "comprising" when utilized, means "including, but not necessarily limited to"; it specifically indicates open-ended inclusion or membership in the so-described combination, group, series, and the like. The invention is illustrated by way of example and not by way of limitation in the figures of the accompanying drawings in which like references indicate similar elements. It should be noted that references to "an" or "one" embodiment in this invention are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

In a first embodiment, referring to FIG. 1 to FIG. 13, the present invention is provided with a floating projection decorative lamp 10, including an outer casing 20 and a light emitting module 30 arranged in the outer casing 20. The outer casing 20 includes a main body part 21 and a mapping part 22 connected to a bottom of the main body part 21. The mapping part 22 is provided with a transmissive pattern, the light-emitting module is configured to emit light towards the transmissive pattern 23, so that the light passing through the transmissive pattern 23 forms a projection pattern corresponding to the transmissive pattern 23.

The light-emitting module of the floating projection decorative lamp of the present invention is of compact size, with a simple light-emitting mode. Moreover, it is capable of projecting patterns and light spots in water. The present invention can be inflated and is made of light-transmitting materials. It is provided with a solar panel integrated inside, thus obviating the necessity of charging or battery replacement. Moreover, it is equipped with a sensing device that can control the illumination of the floating projection decorative lamp according to the changes in the brightness of the surrounding light. The floating projection decorative lamp provided by the present invention has a simple structure, low cost, and compact size. It can provide users a better using experience.

In one embodiment, the light-emitting module arranged in the outer casing directs light onto the mapping part. After passing through the transmissive pattern on the mapping part, projection patterns corresponding to the transmissive pattern can be presented in water.

The main body part 21 encloses a first accommodating space 24, the mapping part 22 is connected to the bottom of the main body part 21 and encloses a second accommodating space 25 together with the main body part 21, and the light emitting module 30 is arranged in the second accommodating space 25.

Specifically, the first accommodating space is located above the second accommodating space. The first accommodating space can be inflated to ensure that the floating projection decorative lamp floats in water. The light-emitting module is positioned in the second accommodating space, which enables the position of the light-emitting module to be adjacent to the transmissive pattern. This way, it maximizes the utilization of the light emitted by the light-emitting module and reduces the attenuation of the light.

The main body part 21 is made of a flexible inflatable material, and the first accommodating space 24 is configured for filling with air. The mapping part 22 is made of the same material as the main body part 21, and a volume of the second accommodating space 25 is smaller than a volume of the first accommodating space 24.

Specifically, the main body part 21 can be fabricated from flexible inflatable materials such as rubber, latex, or soft plastic. The first accommodating space can provide buoyancy for the floating projection decorative lamp after being inflated, and the second accommodating space is smaller than the first accommodating space. By reducing the second accommodating space to the maximum extent, the first accommodating space becomes larger. Consequently, larger buoyancy can be provided for the floating projection decorative lamp.

The light-emitting module 30 includes a housing 31 and a first light source 32 arranged in the housing 31, a light-passing opening 33 is arranged on one side of the housing 31 facing the transmissive pattern 23, and the first light source 32 is arranged in the light-passing opening 33. Specifically, the housing 31 is assembled from two housing parts. The first light source is comparatively close to the light-passing opening, and the area of the light-passing opening is comparatively large. Such a design enables more light to be emitted by the first light source, which can then pass through the light-passing opening and shine onto the transmissive pattern.

The light emitting module 30 further includes a circuit board 34 and a battery 35 arranged in the housing 31, the first light source 32 is arranged on the circuit board 34, and the battery 35, the circuit board 34 and the first light source 32 are electrically connected in sequence, thereby enabling the battery to supply power to the first light source through the circuit board.

The light emitting module 30 further includes a solar panel 311, the solar panel 311 is arranged on an outside of the housing 31, the solar panel 311 is positioned to face upward, and the solar panel 311 is electrically connected to the circuit board 34. It can be understood that the solar panel can absorb external light to charge the battery. This enables the floating projection decorative lamp to avoid the need for battery replacement or manual charging, which provides convenience for users.

The light emitting module 30 further includes a sensing device 37 arranged on the circuit board 34, the housing 31 is provided with a through hole 312, the through hole 312 is arranged to face upward, and the sensing device 37 corresponds to a position of the through hole 312. It can be understood that the sensing device can receive the changes in external light through the through hole. When the external light is too dim, the sensing device can send a signal to the main board, causing the main board to power on all the light sources. When the external light is too bright, the sensing device can send a signal to the main board, causing the main board to power off all the light sources. In this way, the floating projection decorative lamp can automatically turn off its light sources during the day and turn them on at night, providing more convenience for users.

The light emitting module 30 further includes a diffusing paper 38, and the diffusing paper is fitted over the through hole. It can be understood that the diffusing paper 38 is fitted over the through hole, which can enable the light covering the diffuser paper to be projected onto the sensing device more evenly, and protect the sensing device inside the through hole from being damaged.

The outer casing 20 is made of a light-transmitting material, enabling the solar panel arranged inside to receive light, thereby charging the floating projection decorative lamp.

The mapping part 22 includes a bottom housing 221, and the transmissive pattern 23 is arranged on the bottom housing 221. However, it can be understood that in some embodiments, no transmissive pattern is arranged on the bottom housing.

The bottom housing 221 is made of PVC. PVC materials have a broad range of applications, which leads to their relatively low cost. Moreover, PVC materials feature high strength and corrosion resistance. Therefore, PVC materials are employed for the bottom housing. Even when the bottom housing is in long-term contact with the water surface, the service life of the bottom housing can be extended.

The transmissive pattern 23 is printed by silk-screening on the bottom housing 221. It can be understood that the cost of silk-screen printing is relatively low, thus enabling further cost reduction.

A shape of the transmissive pattern 23 can be any one or combination of an animal shape, a plant shape, a geometric shape and an irregular shape. It can be understood that the transmissive pattern 23 can be in a variety of styles. For example, when the transmissive pattern is in the shape of a flamingo, the floating projection decorative lamp can project the pattern shape of the flamingo in the water. This not only increases the interest but also provides users with various choices.

The floating projection decorative lamp 10 further includes a protective cover 40, the protective cover 40 is arranged in the second accommodating space 25, and the protective cover is located above the transmissive pattern 23. It can be understood that the protective cover is located above the transmissive pattern to protect the transmissive pattern from being crushed.

The protective cover 40 is made of a transparent material. Using a transparent material for the protective cover can reduce the loss of light intensity.

The light emitting module 30 further includes a light-gathering cover 39, the light-gathering cover 39 is connected to the light-passing opening 33, and a plurality of transparent protrusions 391 are arranged on an inner sidewall of the light-gathering cover 39.

In some embodiments, the light-emitting module further includes the light-gathering cover. No transmissive pattern is arranged on the mapping part. The light-gathering cover is made of a transparent material. The transparent protrusions arranged on the inner sidewall of the light-gathering cover can play a role in converging light rays, so that light spots can be presented on the water surface after passing through the mapping part. The light-emitting module 30 is detachably connected to the main body part 21.

Figure 14:
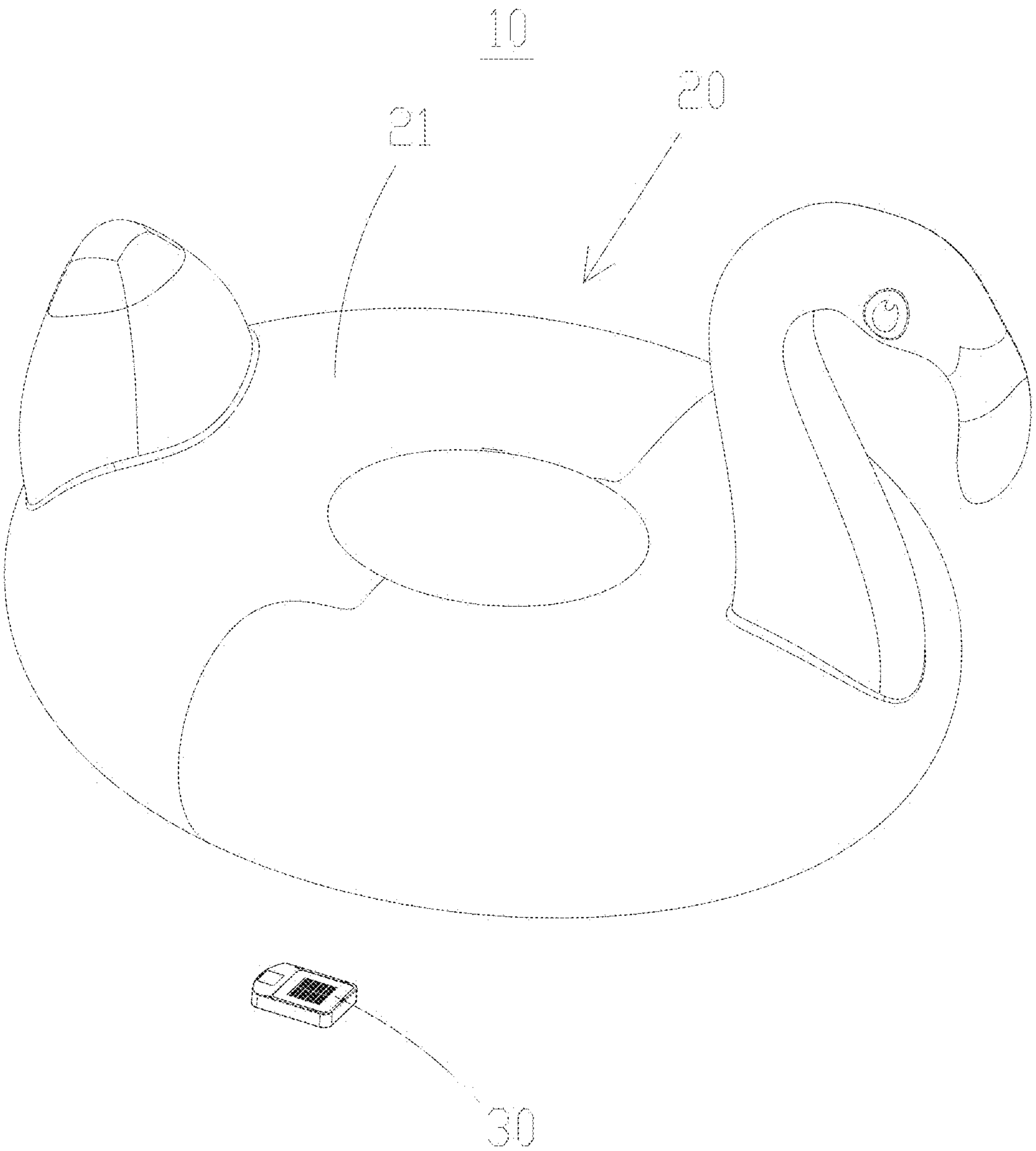
FIG. 14 is a cross-sectional view of a floating projection decorative lamp of a second embodiment of the present invention.

Referring to FIG. 14, in a second embodiment, the mapping part is removably fitted into the second accommodating space on the bottom of the main body part. With the outer housing and the housing being made of comparatively hard plastic materials, the floating projection decorative lamp can float on the water surface without the need for inflation.

The light emitting module 30 further includes a second light source 321, the second light source 321 is electrically connected to the circuit board 34, and the second light source 321 is arranged towards the main body part 21. The second light source can illuminate an upper portion of the floating projection decorative lamp to provide a better experience for users.

A first light-transmitting cover 314 is arranged on one sidewall of the housing 31 towards the main body part 21, and a position of the first light-transmitting cover 314 corresponds to the second light source 321; a second light-transmitting cover 313 is arranged on one sidewall of the housing 31 away from the main body part 21, and a position of the second light-transmitting cover 313 corresponds to the first light source 32.

Evidently, the first light-transmitting cover is made of a transparent material, which enables the light emitted by the second light source to pass through and illuminate the area above. Meanwhile, the second light-transmitting cover is also made of a transparent material, allowing the light emitted by the first light source to pass through and shine into the water.

The floating projection decorative lamp 10 further includes an inflation port 50, and the inflation port 50 is arranged on a sidewall of the main body part 21; the floating projection decorative lamp further includes a hanging head 60, and the hanging head 60 is arranged at a top of the floating projection decorative lamp 10. Users can inflate the main body part through the inflation port, and with the simple and practical structure, they can also tie a rope to the hanging head to prevent the floating projection decorative lamp from floating away.

The above description only describes embodiments of the present invention, and is not intended to limit the present invention; various modifications and changes can be made to the present invention. Any modifications, equivalent substitutions, and improvements made within the spirit and scope of the present invention are intended to be included within the scope of the present invention.

What is claimed is:

1. A floating projection decorative lamp, comprising
an outer casing; and
a light emitting module arranged in the outer casing,
wherein the outer casing comprises a main body part and a mapping part connected to a bottom of the main body part; the mapping part is provided with a transmissive pattern, the light-emitting module is configured to emit light towards the transmissive pattern, so that the light passing through the transmissive pattern forms a projection pattern corresponding to the transmissive pattern,
wherein the main body part encloses a first accommodating space, the mapping part is connected to the bottom of the main body part and encloses a second accommodating space together with the main body part, and the light emitting module is arranged in the second accommodating space,
wherein the main body part is made of a flexible inflatable material, the first accommodating space is configured for filling with air, the mapping part is made of the same material as the main body part, and a volume of the second accommodating space is smaller than a volume of the first accommodating space.

2. The floating projection decorative lamp according to claim 1, wherein the light-emitting module comprises a housing and a first light source arranged in the housing, a light-passing opening is arranged on one side of the housing facing the transmissive pattern, and the first light source is arranged in the light-passing opening.

3. The floating projection decorative lamp according to claim 2, wherein the light emitting module further comprises a circuit board and a battery arranged in the housing, the first light source is arranged on the circuit board, and the battery, the circuit board and the first light source are electrically connected.

4. The floating projection decorative lamp according to claim 3, wherein the light emitting module further comprises a solar panel, the solar panel is arranged on an outside of the housing, the solar panel is positioned to face upward, and the solar panel is electrically connected to the circuit board.

5. The floating projection decorative lamp according to claim 2, wherein the light emitting module further comprises a sensing device arranged on the circuit board, the housing is provided with a through hole, the through hole is arranged to face upward, and the sensing device corresponds to a position of the through hole.

6. The floating projection decorative lamp according to claim 5, wherein the light emitting module further comprises a diffusing paper, and the diffusing paper is fitted over the through hole.

7. The floating projection decorative lamp according to claim 1, wherein the outer casing is made of a light-transmitting material.

8. The floating projection decorative lamp according to claim 1, wherein the mapping part comprises a bottom housing, and the transmissive pattern is arranged on the bottom housing.

9. The floating projection decorative lamp according to claim 8, wherein the bottom housing is made of PVC.

10. The floating projection decorative lamp according to claim 8, wherein the transmissive pattern is printed by silk-screening on the bottom housing.

11. The floating projection decorative lamp according to claim 1, wherein a shape of the transmissive pattern 23 can be any one or combination of an animal shape, a plant shape, a geometric shape and an irregular shape.

12. A floating projection decorative lamp, comprising:
an outer casing; and
a light emitting module arranged in the outer casing,
wherein the outer casing comprises a main body part and a mapping part connected to a bottom of the main body part; the mapping part is provided with a transmissive pattern, the light-emitting module is configured to emit light towards the transmissive pattern, so that the light passing through the transmissive pattern forms a projection pattern corresponding to the transmissive pattern,
wherein the main body part encloses a first accommodating space, the mapping part is connected to the bottom of the main body part and encloses a second accommodating space together with the main body part, and the light emitting module is arranged in the second accommodating space,
wherein the floating projection decorative lamp further comprises a protective cover, the protective cover is arranged in the second accommodating space, and the protective cover is located above the transmissive pattern.

13. The floating projection decorative lamp according to claim 12, wherein the protective cover is made of a transparent material.

14. A floating projection decorative lamp, comprising:
an outer casing; and
a light emitting module arranged in the outer casing,
wherein the outer casing comprises a main body part and a mapping part connected to a bottom of the main body part; the mapping part is provided with a transmissive pattern, the light-emitting module is configured to emit light towards the transmissive pattern, so that the light passing through the transmissive pattern forms a projection pattern corresponding to the transmissive pattern, wherein the light-emitting module comprises a housing and a first light source arranged in the housing, a light-passing opening is arranged on one side of the housing facing the transmissive pattern, and the first light source is arranged in the light-passing opening, wherein the light emitting module further comprises a light-gathering cover, the light-gathering cover is connected to the light-passing opening, and a plurality of transparent protrusions are arranged on an inner sidewall of the light-gathering cover.

15. The floating projection decorative lamp according to claim 1, wherein the light emitting module is detachably connected to the main body part.

16. The floating projection decorative lamp according to claim 3, wherein the light emitting module further comprises a second light source, the second light source is electrically connected to the circuit board, and the second light source is arranged towards the main body part.

17. The floating projection decorative lamp according to claim 16, wherein a first light-transmitting cover is arranged on one sidewall of the housing towards the main body part, and a position of the first light-transmitting cover corresponds to the second light source; a second light-transmitting cover is arranged on one sidewall of the housing away from the main body part, and a position of the second light-transmitting cover corresponds to the first light source.

18. The floating projection decorative lamp according to claim 1, wherein the floating projection decorative lamp further comprises an inflation port, and the inflation port is arranged on a sidewall of the main body part; the floating projection decorative lamp further comprises a hanging head, and the hanging head is arranged at a top of the floating projection decorative lamp.

* * * * *